United States Patent
Groarke et al.

(10) Patent No.: US 11,514,180 B2
(45) Date of Patent: Nov. 29, 2022

(54) COMPUTER-IMPLEMENTED METHOD FOR REMOVING ACCESS TO DATA

(71) Applicant: MASTERCARD INTERNATIONAL INCORPORATED, Purchase, NY (US)

(72) Inventors: Peter Groarke, Dublin (IE); Hubert Graja, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 208 days.

(21) Appl. No.: 16/773,210

(22) Filed: Jan. 27, 2020

(65) Prior Publication Data

US 2020/0265156 A1    Aug. 20, 2020

(30) Foreign Application Priority Data

Feb. 15, 2019    (EP) ..................................... 19157577

(51) Int. Cl.
*G06F 21/62*    (2013.01)

(52) U.S. Cl.
CPC .. *G06F 21/6218* (2013.01); *G06F 2221/2107* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 9,245,149 B1* | 1/2016 | Chereshnev | G06F 21/6245 |
| 9,659,025 B1 | 5/2017 | Teerink et al. | |
| 10,229,138 B2* | 3/2019 | Biswas | G06F 16/215 |
| 2004/0139128 A1* | 7/2004 | Becker | G06F 11/1456 |
| 2011/0055559 A1* | 3/2011 | Li | H04L 9/0894 |
| | | | 713/165 |
| 2011/0185403 A1* | 7/2011 | Dolan | G06F 21/6218 |
| | | | 726/6 |
| 2012/0066262 A1* | 3/2012 | Greenberg | G06Q 10/101 |
| | | | 707/784 |
| 2012/0331539 A1* | 12/2012 | Matsugashita | H04L 63/0807 |
| | | | 726/9 |

(Continued)

FOREIGN PATENT DOCUMENTS

| | | |
|---|---|---|
| KR | 10-2016-0040399 | 4/2016 |
| WO | WO2018/004602 | 1/2018 |
| WO | WO2019/028405 | 2/2019 |

*Primary Examiner* — Jason Chiang
(74) *Attorney, Agent, or Firm* — Harness, Dickey & Pierce, P.L.C.

(57) ABSTRACT

A computer-implemented method is provided for removing access to data, comprising: receiving a request from the user to delete the user data; suspending control of the user data; generating a second database comprising the user data under full control of the user; deleting the user data from the database; and, on request re-integrating the user data into the same database or integrating into a further database. By providing a database under complete control of the user and outside the control of any database manager or service provider, users are given more freedom to decide what to do with their data. They can choose to protect it, or to monetize it themselves by selling it or licensing it. They can also create a plurality of copies, allowing sales to more than one database manager or service provider.

11 Claims, 3 Drawing Sheets

(56) References Cited

U.S. PATENT DOCUMENTS

| | | |
|---|---|---|
| 2013/0024427 A1 | 1/2013 | Long |
| 2013/0103727 A1* | 4/2013 | Marcotte ................ G06F 16/13 |
| | | 707/827 |
| 2015/0095243 A1* | 4/2015 | Eiler ..................... G06Q 10/10 |
| | | 705/312 |
| 2016/0321339 A1 | 11/2016 | Tekade et al. |
| 2017/0032138 A1* | 2/2017 | Navda ................ G06F 3/04842 |
| 2017/0351871 A1 | 12/2017 | Christiansen |
| 2018/0123822 A1* | 5/2018 | Zibuschka ............ H04L 63/102 |
| 2019/0124504 A1* | 4/2019 | Tran ...................... H04W 8/183 |
| 2019/0156053 A1* | 5/2019 | Vogel .................. G06F 21/6245 |
| 2019/0163928 A1* | 5/2019 | Hankeln ................ G06F 21/62 |
| 2019/0180052 A1* | 6/2019 | Barday ................ G06F 21/577 |
| 2019/0303595 A1* | 10/2019 | Kosaka .................. G06F 16/21 |
| 2019/0342336 A1* | 11/2019 | Finkelstein ............ H04L 63/20 |
| 2019/0347442 A1* | 11/2019 | Marlin ................. H04L 63/102 |
| 2020/0004762 A1* | 1/2020 | Malhotra ............ G06F 21/6245 |
| 2020/0012978 A1* | 1/2020 | Brannon ............ G06F 21/6245 |
| 2020/0042743 A1* | 2/2020 | Barday ................ G06F 21/552 |
| 2020/0201526 A1* | 6/2020 | Kuchibhotla ......... G06F 3/0481 |
| 2020/0250333 A1* | 8/2020 | Nemoto ............. G06F 21/6218 |
| 2020/0293514 A1* | 9/2020 | Rudek .................. G06F 16/245 |
| 2020/0302081 A1* | 9/2020 | Faitelson ................ G06F 21/31 |
| 2020/0387625 A1* | 12/2020 | Saad .................... G06F 21/602 |

\* cited by examiner

COMPUTER-IMPLEMENTED METHOD FOR REMOVING ACCESS TO DATA

CROSS-REFERENCE TO RELATED APPLICATION

This application claims the benefit of, and priority to, European Patent Application No. 19157577.8 filed on Feb. 15, 2019. The entire disclosure of the above application is incorporated herein by reference.

FIELD

The present disclosure relates to a computer-implemented method for removing access to user data comprised in a database.

BACKGROUND

This section provides background information related to the present disclosure which is not necessarily prior art.

Users (or consumers) make increasing use of services which result in the storage of their user data. In many cases, the supply of user data is a condition for using the service. Legislation confers a number of rights on users to control how their user data is used, such as a right to be forgotten (right to erasure), but the processes and mechanisms to invoke these rights are complex. In addition, when a user wishes to change service providers, they usually have to manually provide at least part of their user data themselves and in many cases, it needs to be entered manually.

It is an object of the disclosure to provide simpler and easier processes for users to control how their user data is managed.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure, there is provided a computer-implemented method for removing access to data, the method comprising: associating data comprised in a first database with a user, the first database being controlled by a first manager; receiving a request from the user for the first manager to delete the user data; suspending control of the user data by the first manager; generating a second database comprising the user data; deleting the user data from the first database; assigning to the user control of the second database and releasing control by the first manager; receiving a request from the user to integrate the user data into a third database, the third database being controlled by a second manager; integrating the user data into the third database; and associating the user data comprised in the third database with the user.

By providing a database under complete control of the user and outside the control of any database manager or service provider, users are given more freedom to decide what to do with their data. They can choose to protect it, or to monetize it themselves by selling it or licensing it. They can also create a plurality of copies, allowing sales to more than one database manager or service provider.

According to a further aspect of the present disclosure, there is provided a computer-implemented method wherein the third database and the first database are substantially the same database and/or wherein the first manager and second manager are substantially the same manager.

By making the user data available to the database from which it originally came, it becomes possible to restore user data very easily. This is much more preferable to the current solution which requires the user data to either be regenerated or re-entered. In some cases, it may be possible to have the data integrated into a different database being operated by the same database manager, allowing for an upgraded status, for example, when moving from a free account to a paid account.

According to another aspect of the present disclosure, there is provided a computer-implemented method further comprising: receiving a request from the user to delete the second database; and deleting the second database.

By giving full control to the user they can decide to retain the user data to provide it to a different database or to delete it. The user can then choose the moment and occasion of complete deletion.

According to yet another aspect of the present disclosure, there is provided a computer-implemented method further comprising: receiving a request from the user to integrate the user data into a further database, the further database being controlled by a further manager; and integrating the user data into the further database.

By giving full control to the user of their database, they can decide to retain the user data to provide it to one or more databases, The user can select the database, and the moment it is supplied, giving them complete transparency and control over their own data in general.

According to a still further aspect of the present disclosure, there is provided a computer-implemented method further comprising: at least partially encrypting the second database and/or further comprising: receiving from the user one or more encryption keys; at least partially encrypting the second database using the encryption keys.

By using encryption, access to the data may be controlled to a very high degree by the user. In addition, if the second database is at least partially encrypted, a copy may be retained by the database manager and/or service provider in case a restore will be requested. The integration can only be completed if the user supplies suitable decryption keys.

According to another aspect of the present disclosure, there is provided a computer-implemented method according to further comprising: receiving from the user one or more data format selections; generating the second database complying with the one or more data formats and/or wherein the second database further comprises data configured and arranged to assist with integration into the first database, the third database and/or the further database.

The risk of failed integration due to a lack of data interoperability may be reduced by allowing the user to select one or more formats for the user data to be provided in. It may also be advantageous for the user data to be accompanied by further data which may be used to interpret the user data or to assist with the integration in a differently-structured database.

According to further aspects of the present disclosure, there is provided a computer-implemented method further comprising: receiving a request from the user for the corresponding manager to delete a further instance of user data from the first database, the third database and/or the further database; suspending control of the further instance of user data by the corresponding manager; including the further instance of user data into the second database, the second database being controlled by the user and releasing control by the corresponding manager; and deleting the further instance of user data from the respective database.

By including more than one instance of user data in the user database, users may provide, maintain, modify and even create user data suitable for different managers and/or service providers, greatly maximizing the monetization of their own data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. To easily identify the discussion of any particular element or act, the most significant digit or digits in a reference number refer to the figure number in which that element is first introduced.

Note that the drawings are schematic and accompany the description, illustrating preferred and exemplary embodiments and not necessarily being drawn to scale. In addition, in general, corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure.

"control of a database" refers to management, including tasks such as access control, authentication control, encryption control, integrity control, backing-up, and security.

"database" refers to computer-implemented storage of data. It may be stored in a single computer location, such as a central server, distributed over two or more computer systems, such as a client and server part, or distributed over a plurality of systems and devices.

"manager of a database" refers to entity exercising some degree of control over a database. Usually acting on behalf of the entity that created the database, or on behalf of a provider of a service which relies on data stored in the database, or the service provider themselves. It may be one or more persons, one or more entities, one or more software application, one or more automated processes, or some combination thereof.

In the following detailed description, numerous non-limiting specific details are given to assist in understanding this disclosure.

It will be obvious to a person skilled in the art that the method may be implemented on any type of standalone system or client-server compatible system containing any type of client, network, server, storage and database elements.

Figure 1:
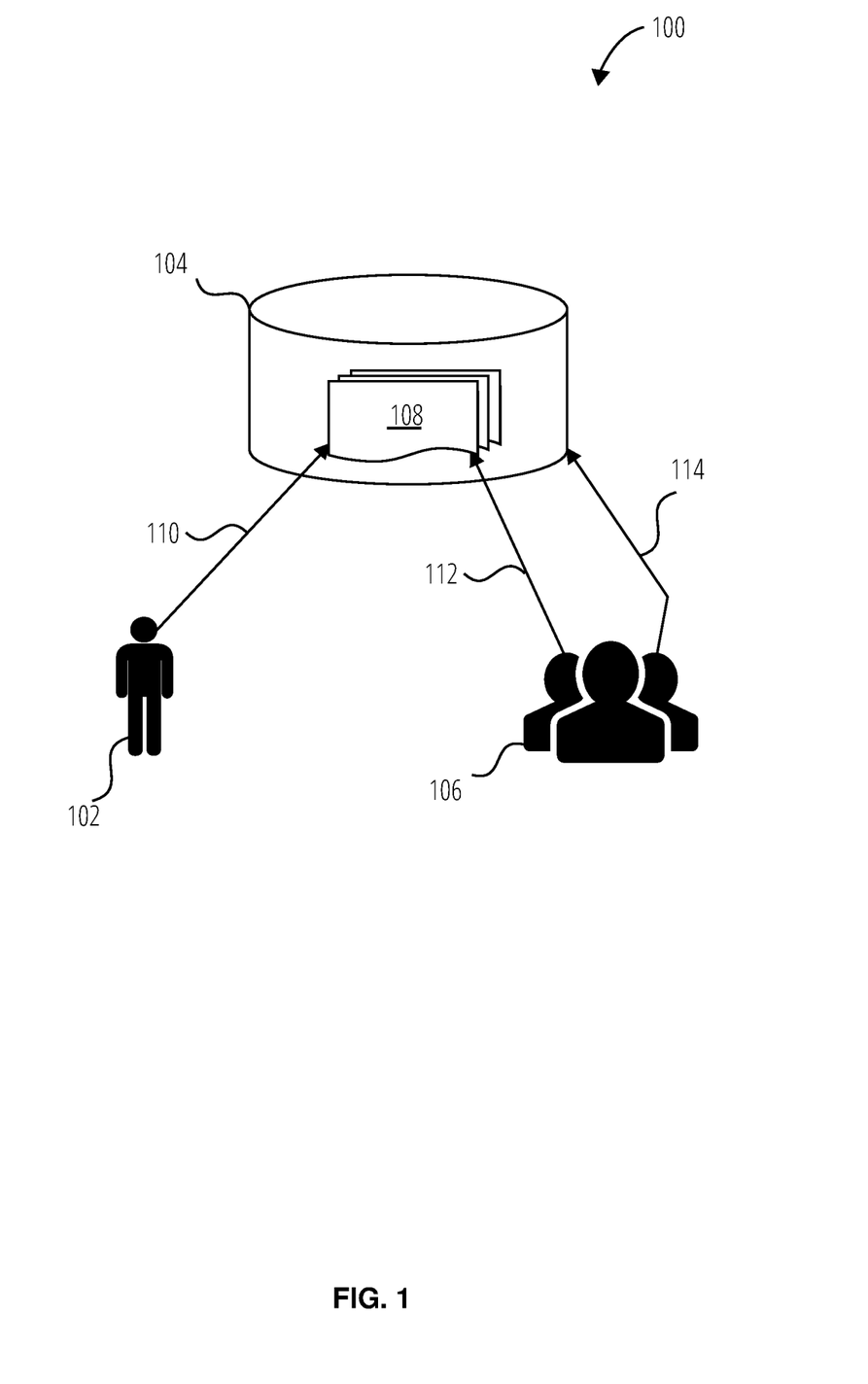
FIG. 1 illustrates a method for managing a conventional database 100.

FIG. 1 depicts a method for managing a conventional database 100. A first database 104 is provided, comprising user data associated with one or more users, and a first manager 106 is assigned 114 control of the first database 104. In many cases, the first manager 106 acts on behalf of the entity that created and/or operates the first database 104, and may be one or more persons, an automated process, or some combination thereof.

The first database 104 comprises one or more data records 108 associated with a user 102. These data records represent the user data 108 for that user 102. Said user data 108 may comprise general data, such as: biographic data, such as phone numbers, e-mail addresses, post addresses; payment data, such as transactions and credit card data; identification data; service usage data; rating data; etc.

The user data 108 may be provided directly by the user 102, be generated during use by the user 102 of a service associated with the first database 104, be copied from a further database to which the provider of the service (not depicted) may have access, publicly available social media profiles, and any combination thereof.

Most on-line services and many off-line services have an associated database, and providing that service relies on data associated with users comprised in that database. In addition to the general data associated with a user they typically store (retain) data specifically associated with the service. For example, internet service providers: provide internet access and stores data, such as browser data, browsing histories, data transfer amounts, data transfer rates, port numbers and IP addresses used to access the service. Telecom providers: provide telephone voice services and stores data, such as contacts, call logs and SMS messages. Search engine providers: provide search results and stores data, such as recent search strings, websites visited based on the searches, location from which services are accessed and voice searches. Cloud service providers: provide cloud storage and stores data, such as data transfer amounts, data transfer rates, port numbers and IP addresses used to access the service. Social media providers: provide access to their platform for sharing information, and store data, such as interests, devices and locations used to access service, ads clicked on, employer, contacts and family relationships. E-mail service providers: provide receipt and delivery of e-mails, and store data such as contacts, data transfer amounts, data transfer rates and keywords that frequently appear in e-mails. Mobile software application providers: provide entertainment and/or service and may store data which can be accessed on the mobile device, such as contacts, call logs, SMS messages, GPS locations, photos and videos. And, payment services providers: provide credit and/or debit card facilities and stores data, such as transaction logs, authentication request logs, transaction refusal, account balance, transaction amounts and payment locations.

In the example of FIG. 1, the user 102 establishes an arrangement with the service provider (not depicted) who relies on data in the first database 104 to operate their service. The arrangement may be established when the user 102 contacts the service provider to use the service, but it is usually established earlier to speed up usage of the service. The arrangement may be established by a form of registration, in which the user 102 is fully aware that an arrangement is being agreed. However, in many cases, the arrangement is established by the user 102 accepting unclear (or hidden) terms and conditions when registering or purchasing a software application (or app), particularly with mobile apps. The user 102 is assigned 110 some degree of control of their user data 108, and the first manager 106 is also assigned 112 some degree of control over said user data 108. The degree of control may vary and may include facilities, such as no access (usually for privacy reasons), read-only access, write-access, delete access, anonymized access, and any combination thereof. Typically, the user 102 is able to at least check and modify their user data 108. In many conventional cases, the first manager 106 has more control over the user data 108 that the user 102 associated with that data.

Legislation and jurisprudence are starting to address this lack of control and awareness by a user 102 of their user data 108 retained by a service provider, and what the service provider does with said user data 108. For example, The Right to be Forgotten (or Right to Erasure), which has been put into practice in, for example, the European Union (EU), following the ruling against Google in the Costeja case. Based on this case, service providers were classified as "data controllers" because of the large amounts of data they collect and process. Consequently, a user may request that certain URL's are removed from the search engine databases. The information is not deleted from the internet, but simply removed from the search engine catalog so that they do not appear in searches as "hits". The requests are reviewed to decide whether "the individual's right to privacy" is greater than "the public's right to know", and whether the URL contents are "inadequate, irrelevant or no longer relevant, or excessive in relation to the purposes for which they were processed". The Data Protection Directive 95/46/EC in the EU, which has now been superseded by the GDPR (see below).

If the user 102 wishes to remove their user data 108 from the first database 104, they typically request the first manager 106 (or the service provider directly) to stop the use of the service and/or to delete said user data 108. However, the user 102 may not be aware that the user data 108 even exists (especially with mobile apps). Even if they do know of its existence, they may not be aware of the extent to which their user data 108 is being retained, managed and even expanded. It is also likely that they are unaware of the contents of their user data 108. This means that the user 102 may incorrectly request the deletion of only part of their user data 108, or mistakenly allow their user data 108 to be retained. Even if their request is correct, the user 102 may not have a sufficient degree of control that they can verify that the deletion of said user data 108 has occurred.

More recent legislation has improved user rights, such as The General Data Protection Regulation (GDPR), version 27 Apr. 2016, which entered into force in the EU on 25 May 2018. This codifies such principles as: a Right to Erasure (a Right to be Forgotten); a Right to Rectification; and a Right to Restriction of Processing.

However, with a conventional database 100, although the user 102 may be able to arrange deletion of said user data 108, it is not possible to change their mind. Following a request from the user 102, the data will be deleted either immediately or within a short-period. Once deleted from the first database 104, the first manager 106 must collect all said user data 108 if the user 102 wishes to continue using the associated service, either immediately after requesting deletion or sometime in the future. There is no easy way for the user 102 to change their mind.

Figure 2:
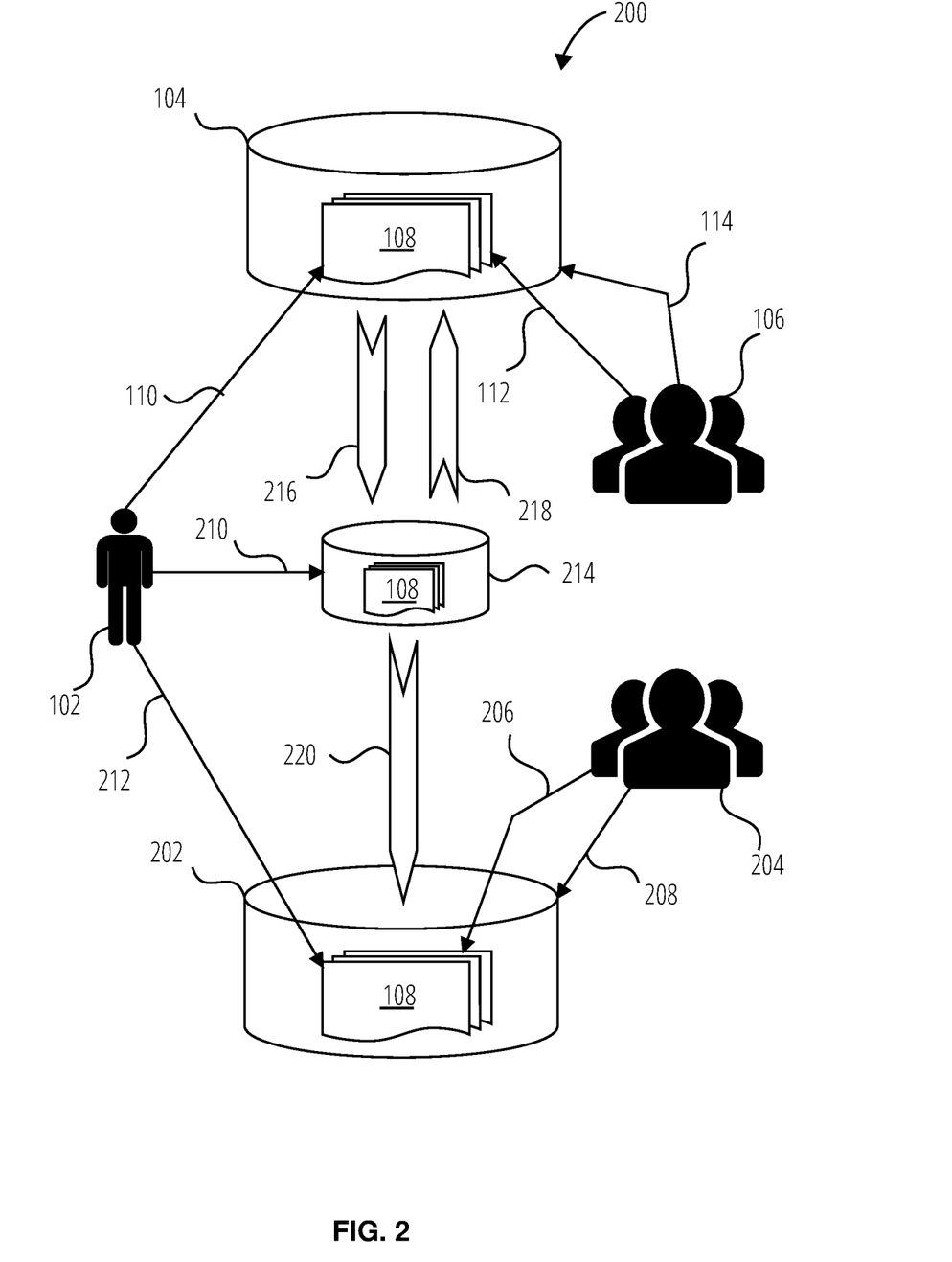
FIG. 2 illustrates an improved method for managing a database 200.
Figure 3:
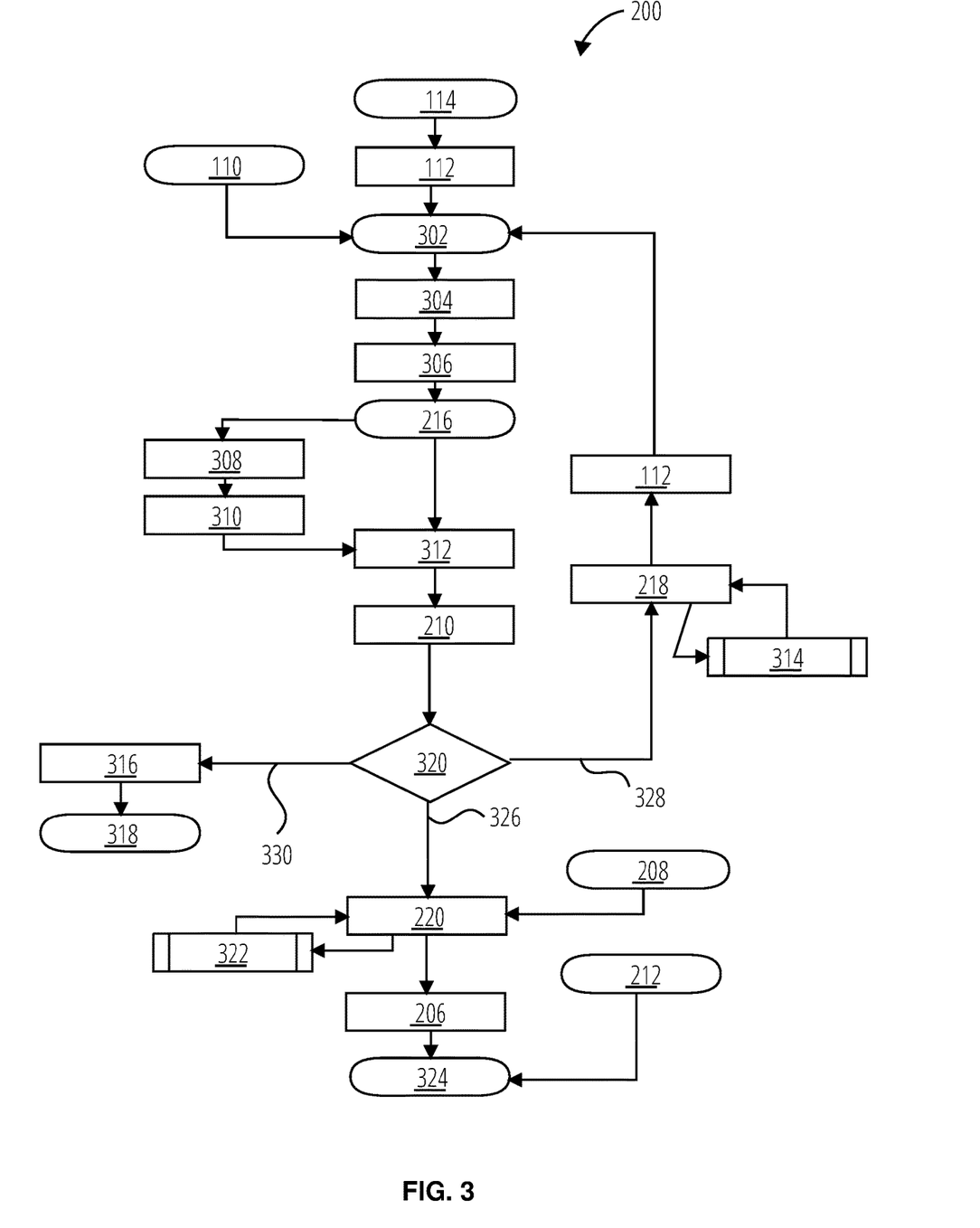
FIG. 3 illustrates possible steps during execution of an improved method for managing a database 200.

FIG. 2 and FIG. 3 depict an improved method for managing a database 200. FIG. 2 shows the different databases and users and the main interactions. FIG. 3 depicts the method 200 as a flowchart with the different options available.

The improved method for managing a database 200 comprises a number of features already described for FIG. 1 above, including: the first database 104 comprising user data 108 for the user 102. The first manager 106 is assigned 114 control of the first database 104; and the user 102 is assigned 110 some degree of control of their user data 108, and the first manager 106 is also assigned 112 some degree of control over said user data 108.

In addition, FIG. 2 also depicts a second database 214 under direct control of the user 102. The first manager 106 manages the first database 104, including managing 302 of said user data 108. The user 102 requests 304 the first manager 106 to delete said user data 108. After receiving 304 the request, the first manager 106 suspends control 306 of said user data 108. The degree to which control is changed depends upon the terms and conditions between the user 102 and the service provider. The degree of control is reduced compared to the situation before the request was received. As a minimum, the first manager 106 may no longer allow the use of the said user data 108 for providing the associated service.

The disclosure is partially based on the insight that user data may have commercial value to the user themselves. Currently, service providers earn money directly by selling or licensing data. However, if the user 102 had full control of their user data 108, they could decide how it is used and by whom. In addition, direct payment may also be available to the user 102. After receiving 304 the request the first manager 106 generates 216 the second database 214 comprising said user data 108. After generating 216 the second database 214, said user data 108 is deleted 312 from the first database 104. Either at the moment of generation 216, or immediately afterwards, control is assigned to the user 102 of the second database 214, and control is released by the first manager 106. The user 102 may then decide 320 what to do with the second database 214, and in particular, what to do with said user data 108.

The user 102 has a high degree of control of the second database 214, preferably substantially full control. The first manager 106 has little control of the second database 214, preferably substantially no control. As described above, the first manager 106 may initiate generation 216 of the second database 214, but this may be performed without any control over the contents of the second database 214. Alternatively, the first manager 106 may determine to some degree the data selected to be included in the second database 214. However, after generation 216, the first manager 106 releases any control that they had of the second database 214.

The user 102 may subsequently choose one or more of the following (this may be immediately, or sometime later, as the user 102 may provide a copy of the second database 214 for integration, a plurality of options is available).

First, to delete 330 the second database 214. As the second database 214 is stored on one or more computers, after receiving 316 a request from the user 102 to delete the second database 214, the second database 214 will be deleted 318.

Second, to retain (not depicted) the second database 214. This may be temporary, until a choice is made for one of the other options. In that case, it may be advantageous for the user 102 to be able to update the user data 108 portion of the second database 214. It may also be permanent, such as for record keeping. In that case, a human-readable portion is preferably included.

Third, to restore 328 said user data 108 to the first database 104. After sending a request to integrate 218 said user data 108 to the first manager 106, and re-assigning 112 control of said user data 108 to the first manager 106, the first manager 106 will arrange that said user data 108 is comprised again in the first database 104 and the first manager 106 will then resume management 302 of said user data 108. The process may be even further controlled by the user if the second database 214 has been at least partially encrypted. The integration may only be carried out after the user 102 has decrypted the data or provided the manager with a suitable decryption key. The user 102 will revert back 110 to the degree of control that the first manager 106 allows. In any case, the user data 108 will be associated 110 with the user 102 again.

And fourth, to offer 326 the second database 214 to one or more other service providers and/or database managers. As the data may have financial value, this may be in the form of a sale or a license. It may also be free-of-charge in exchange for being able to use the associated service. For example, as depicted in FIG. 2 and FIG. 3, a third database 202 may be provided, comprising user data associated with one or more users. A second manager 204 is assigned 208 control of the third database 202, which is similar to the first database 104. The data is associated with a service provider (not depicted) who relies on data in the third database 202 to operate their service. The second manager 204 is also similar to the first manager 106. After sending a request to integrate 220 said user data 108 to the second manager 204, control is assigned 206 to the second manager 204 of said user data 108. The second manager 204 will arrange that said user data 108 is comprised in the third database 202, and the second manager 204 will then assume management 324 of said user data 108. The process may be even further controlled by the user if the second database 214 has been at least partially encrypted. The integration may only be carried out after the user 102 has decrypted the data or provided the manager with a suitable decryption key. The user 102 will be associated 212 with the degree of control that the second manager 204 allows. In any case, the user data 108 will be associated 212 with the user 102.

The second database 214 may consist only of said user data 108. Preferably, it also comprises additional data to support the possible decisions 310 by the user 102.

Such decisions 310 may include assisting in restoring 218 said user data 108 into the first database 104. For example, said user data 108 may be provided in a human-readable form so that the user 102 may read and verify the contents, and a binary portion may be included representing the data storage records and formats used by the first database 104. If said user data 108 is subsequently restored to the first database 104, then this binary portion will be integrated 218.

Such decisions 310 may also include assisting in integrating 220 said user data 108 into a further database, such as the third database 202. For example, if the user data 108 is provided in CSV format, an additional explanation of the database fields may be provided so that import into another database is supported. Note that the GDPR codifies a Right to Data Portability, and encourages data processors (service providers) to draw up interoperability standards to facilitate the exchange of data. So, for example, the second database 214 may comprise a plurality of portions, each one complying with a possible standard. The method may also comprise an additional step, where one or more data format selections is received from the user 102 and the second database 214 is generated in compliance with the one or more data formats.

FIG. 3 also depicts more optional steps in the improved method for managing a database 200.

For example, some time may have passed between the generation 216 of the second database 214 and the request to integrate 218 back (restore) into the first database 104. The contents of the second database 214 may not be fully compatible any more. In that case, it may be necessary to convert 314 the second database 214 to a suitable format for integrating into the first database 104. Similarly some time may have passed between the generation 216 of the second database 214 and the request to integrate 220 into the third database 202. Or the third database 202 may require a different format. In that case, it may be necessary to convert 322 the second database 214 to a suitable format for integrating into the third database 202.

After generation 216 of the second database 214, the first manager 106 releases control of the second database 214 and releases control of the user data 108. A higher degree of certainty is provided if the second database 214 is at least partially encrypted. If the user 102 provides 308 one or more encryption keys, the second database 214 may then be at least partially encrypted 310 using the encryption keys. If only the user 102 has access to these encryption keys, then no other parties, and in particular no other managers 106, 204, will be able to access the user data 108 in the second database 214. For example, the user 102 may supply his public key to the manager to perform the encryption. Once encrypted, decryption requires his private key which no-one else knows. For this purpose, single use public-private pair keys may preferably be used, so that the manager who integrates the data can only decrypt the user data once.

Although a distinction has been made in the description between a first database 104 and a third database 202, these are interchangeable from a technical point of view. Similarly, the first manager 106 and the second manager 204 are technically interchangeable.

The user 102 may provide, sell, license the user data 108 to a plurality of managers 106, 204 who have been assigned to one or more of a plurality of databases 104, 202.

Similarly, the user 102 may also generate a plurality of second databases 214 by requesting one or more managers 106, 204 to delete their user data 108 one or more times.

The user 102 may also create and/or maintain a second database 214 comprising a plurality of instances of user data 108, for example, from a plurality of databases and/or from a single database a plurality of times. In that case, the method further comprises: receiving 304 a request from the user 102 for the corresponding manager 106, 204 for a database to delete a further instance of user data 108 from the first database 104, the third database 202 and/or a further database 104, 202; suspending control 306 of the further instance of user data 108 by the corresponding manager 106, 204; including the further instance of user data 108 into the second database 214, the second database 214 being controlled by the user 102; and deleting 312 the further instance of user data 108 from the respective database 104, 202.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for removing access to data, the method comprising:
    associating user data comprised in a first database with a user, the first database comprising the user data specific to the user and user data specific to one or more other users, the first database being controlled by a first manager;
    receiving a request from the user for the first manager to delete the user data;
    suspending control of the user data by the first manager;
    generating, by the first manager, a second database comprising the user data specific to the user but not the user data specific to the one or more other users, the second database being controlled by the first manager;
    deleting the user data from the first database after generating the second database;
    assigning to the user control of the second database and releasing control of the second database by the first manager;
    receiving a request from the user to integrate the user data into a third database, the third database being controlled by a second manager;
    integrating the user data into the third database; and
    associating the user data comprised in the third database with the user.

2. The computer-implemented method of claim 1, wherein the third database and the first database are the same database.

3. The computer-implemented method of claim 1, wherein the first manager and second manager are the same manager.

4. The computer-implemented method of claim 1 further comprising:
    receiving a request from the user to delete the second database; and
    deleting the second database.

5. The computer-implemented method of claim 1 further comprising:
    converting the user data in the second database to a suitable format for integrating into the first database and/or the third database.

6. The computer-implemented method of claim 1 further comprising:
    receiving a request from the user to integrate the user data into a further database, the further database being controlled by a further manager; and
    integrating the user data into the further database.

7. The computer-implemented method of claim 1 further comprising:
    at least partially encrypting the second database.

8. The computer-implemented method of claim 7, further comprising:
    receiving from the user one or more encryption keys; and
    at least partially encrypting the second database using the one or more encryption keys.

9. The computer-implemented method of claim 1 further comprising:
    receiving from the user one or more data format selections; and
    generating the second database complying with the one or more data formats.

10. The computer-implemented method of claim 1, wherein the second database further comprises data configured and arranged to assist with integration into the first database and/or the third database.

11. The computer-implemented method of claim 1 further comprising:
    receiving a request from the user for the first manager to delete a further instance of user data from the first database;

suspending control of the further instance of user data by the first manager;
integrating the further instance of user data into the second database; and
deleting the further instance of user data from the first database.

\* \* \* \* \*